United States Patent [19]
Sato

[11] Patent Number: 5,144,210
[45] Date of Patent: Sep. 1, 1992

[54] CAPSTAN SERVO DEVICE

[75] Inventor: Tsuguo Sato, Kanagawa, Japan

[73] Assignee: Sony Corporation, Tokyo, Japan

[21] Appl. No.: 783,257

[22] Filed: Oct. 28, 1991

[30] Foreign Application Priority Data

Oct. 31, 1990 [JP] Japan .................................... 292132

[51] Int. Cl.$^5$ ...................... H02K 29/10; G05B 19/08
[52] U.S. Cl. .................................... 318/560; 318/561; 318/138; 318/254; 318/603; 388/812; 360/9.1; 360/10.2
[58] Field of Search ........................ 318/560-570, 318/600-620, 138, 254, 439; 360/10.2, 10.3, 9.1, 23, 31, 51, 69, 70, 71, 73.11, 73.14, 72.2, 74.1; 388/800, 805, 812, 814, 820, 907.5, 912, 928.1

[56] References Cited

U.S. PATENT DOCUMENTS

| | | | |
|---|---|---|---|
| 3,492,441 | 1/1970 | James ........................... | 360/23 |
| 4,443,823 | 4/1984 | Sakamoto ........................ | 360/10.2 X |
| 4,506,202 | 3/1985 | Tajima et al. ....................... | 318/603 |
| 4,558,382 | 12/1985 | Edakubo et al. ................... | 360/10.2 X |
| 4,613,914 | 9/1986 | Kobori et al. ..................... | 360/70 |
| 4,630,146 | 12/1986 | Takayama et al. ................ | 360/10.2 X |
| 4,862,045 | 8/1989 | Gleim et al. ....................... | 318/254 |

Primary Examiner—Paul Ip
Attorney, Agent, or Firm—Alvin Sinderbrand; William S. Frommer

[57] ABSTRACT

A capstan servo device comprising a frequency generator for detecting the rotation rate of a capstan motor and generating two-phase FG signals mutually having a 90° phase difference; a selector for selecting one of input four-phase signals produced from the two-phase FG signals and mutually having a 90° phase difference; and a sync signal generator including an N-bit counter (where N≧2) to receive a reference frequency signal inputted thereto and generating a sync signal by phase-comparing the two high-order bits of the frequency-divided output of the counter with the two-phase FG signals. In this device, the rotation speed of the capstan motor is controlled in accordance with an error voltage signal selected by the selector in response to the sync signal.

5 Claims, 9 Drawing Sheets

CAPSTAN SERVO DEVICE

BACKGROUND OF THE INVENTION

1. Field of the Invention

The present invention relates to a capstan servo device for use in a video tape recorder (hereinafter referred to as VTR) which reproduces a video signal and so forth at a changed speed from a tape-shaped recording medium such as a magnetic tape.

2. Description of the Prior Art

Figure 8:
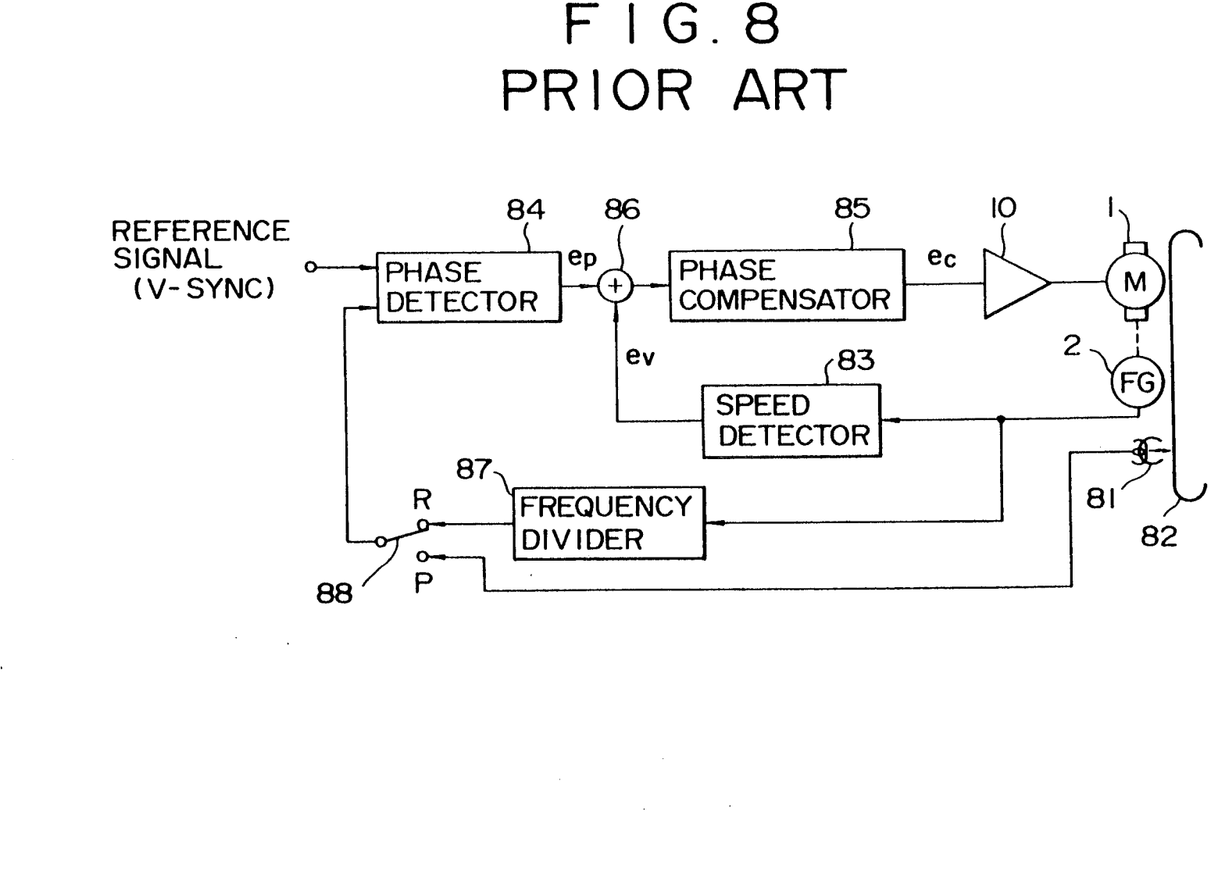
FIG. 8 is a block diagram of a conventional capstan servo device.

FIG. 8 is a block diagram of a conventional capstan servo device which includes a capstan motor 1, a frequency generator (hereinafter referred to as FG) 2 for generating a frequency signal proportional to the rotation rate of the capstan motor 1, a speed detector 83 for detecting a speed error $e_v$ by frequency-discriminating the FG signal, a phase compensator 85, a mixer 86, and a driver 10. Such component elements constitute a speed loop for controlling the rotation speed of the capstan motor 1 to maintain the same constant.

Meanwhile another group of component elements, such as a frequency divider 87, a phase detector 84 for detecting a phase error $e_p$ between the demultiplied output signal of the frequency divider 87 and a reference signal (hereinafter referred to as V-SYNC), and a circuit for supplying such phase error $e_p$ to the mixer 86, constitute a phase loop for controlling the rotation phase of the capstan motor 1 and maintaining the same constant.

The motion of a magnetic tape 82 is maintained at a constant speed by such two control loops. And in a recording mode where a switch circuit 88 is connected to a recording (R) side, the capstan motor 1 is rotated in synchronism with the rotation phase of the V-SYNC signal. Meanwhile in a playback mode where the switch circuit 88 is connected to a playback (P) side, the capstan motor 1 is so rotated that a CTL signal, which is read out by a control head 81 from a control track (not shown) on the magnetic tape 82 and serves as a comparison signal, is synchronized in phase with the V-SYNC signal.

It is generally known in the recent capstan servo devices that, in addition to a recording/playback mode executed with constant-speed rotation of a capstan motor, there are also prepared some other operation modes such as a mode to reproduce a still picture by controlling the stop position of a magnetic tape through control of the rotation and stop of the capstan motor, and a mode to perform changed-speed playback by controlling the capstan motor continuously from slow rotation to fast rotation. In view of such circumstances, further precise control is urgently required.

With regard to the still picture playback mode, an exemplary technique is disclosed in Japanese Pat. Laid-open No. Sho 60 (1985)-39382, wherein the precision relative to the stop position of a capstan motor is enhanced by additionally connecting a stop control circuit to the aforementioned speed and phase servo loops.

Now such stop control for a capstan motor will be described below with reference to a block diagram of FIG. 9 and waveform timing charts of FIGS. 10A-10J.

Figure 9:
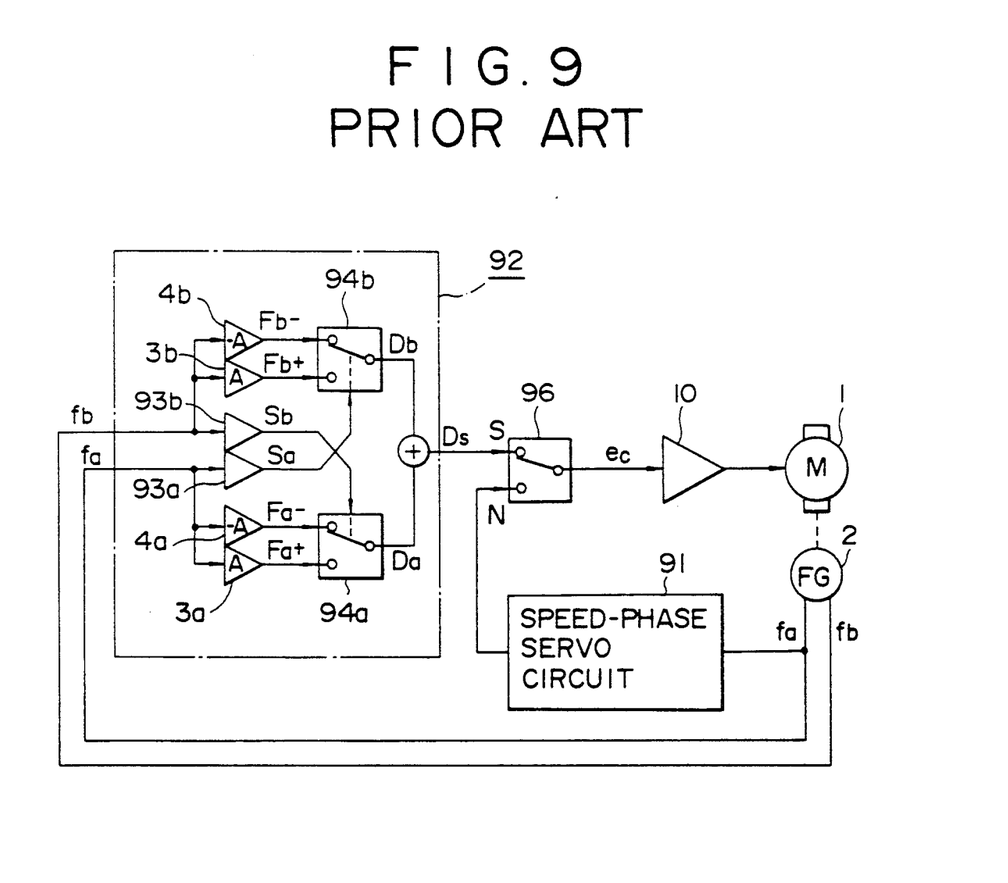
FIG. 9 is a block diagram of a conventional capstan servo device equipped with a stop control circuit.
Figure 10A:
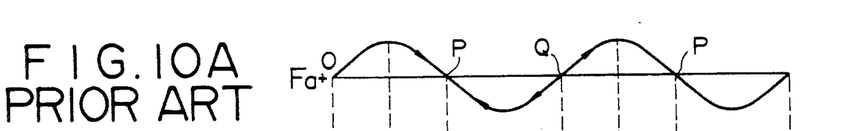
Figure 10B:
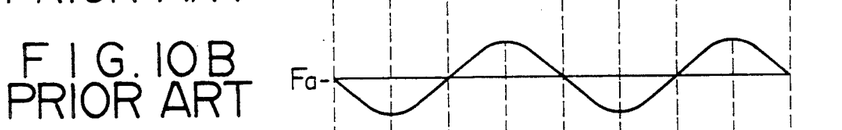
Figure 10C:
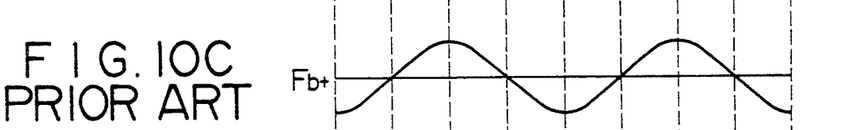
Figure 10D:
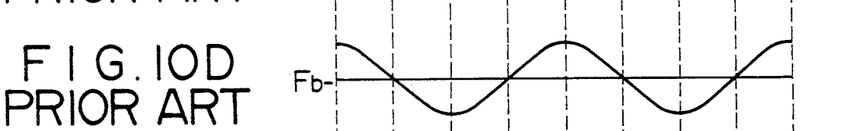

In a state where a switch circuit 96 is connected to its N side in FIG. 9, a capstan motor 1 is rotated at a normal constant speed under control of a known speed-phase servo circuit 91. And when the switch circuit 96 is changed to its S side representing a stop mode, a signal $F_{a+}$ of FIG. 10A produced from an FG signal $f_a$ is supplied as a stop signal relative to a driver 10. In this case, the capstan motor 1 is so controlled as to stop when the voltage applied to the driver 10 is reduced to zero, and the rotation speed is accelerated by a positive voltage increased from the zero point or is decelerated by a negative voltage decreased therefrom. Accordingly, in case a zero crossing point is in each of right slope portions P and left slope portions Q as shown in FIG. 10A, a stable point adapted for stop control is merely the point P while the stability is attained at any point Q, and desired stability is achieved with a shift to either the anterior or posterior point P.

Figure 10E:
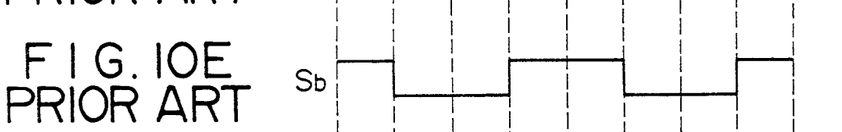
Figure 10F:
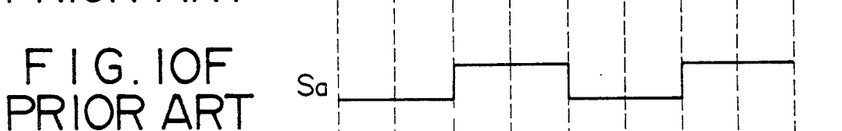
Figure 10G:
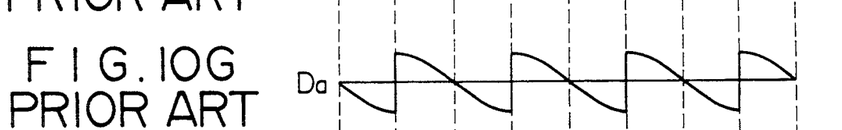
Figure 10H:
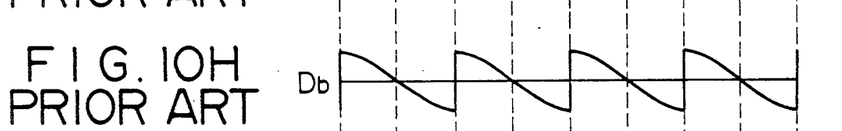

Referring back to the circuit configuration of FIG. 9, the FG 2 generates two-phase signals $f_a$ and $f_b$ mutually having a 90° phase difference. Such two-phase signals $f_a$ and $f_b$ are supplied respectively to non-inverting amplifiers 3a, 3b and inverting amplifiers 4a, 4b of a stop control circuit 92 to become four-phase signals $F_{a+}$, $F_{a-}$ and $F_{b+}$, $F_{b-}$ shown in FIGS. 10A through 10D. And simultaneously the two-phase signals $f_a$, $f_b$ are supplied also to comparators 93a, 93b to be converted into pulses at the average-level zero crossing points, whereby rectangular signals Sa, Sb of FIGS. 10E and 10F are obtained. The four-phase signals $F_{a+}$, $F_{a-}$ and $F_{b+}$, $F_{b-}$ are supplied to switch circuits 94a and 94b respectively and are thereby switched in accordance with the rectangular pulses $S_a$ and $S_b$, so that merely the right slope portions alone are extracted to produce signals $D_a$ and $D_b$ of waveforms shown in FIGS. 10G and 10H. Thereafter such signals Da and Db are mixed with each other in a mixer 95 to become a signal $D_s$ of FIG. 10J where the zero crossing points in the former four-phase waveforms are in the right slope portions alone.

Figure 10J:
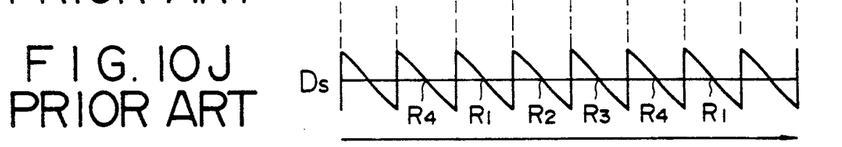

If the signal $D_s$ thus obtained is fed as a stop control voltage to the driver 10 in place of the aforementioned signal $F_{a+}$, then the stop of the capstan motor is controlled at the zero crossing points R1-R4 shown in FIG. 10J, so that the stop position accuracy is rendered four times higher than the value in the aforementioned case of using the signal $F_{a+}$ as a stop control voltage.

By the employment of such stop control circuit disclosed in the cited Japanese patent, it becomes possible to control the stop position of a magnetic tape with an enhanced four-fold higher precision without the necessity of increasing the frequency of the FG.

In the conventional capstan motor control system where the speed loop based on the FG signal is included in the phase loop based on the V-SYNC signal and the CTL signal as shown in the block diagram of FIG. 8, it is possible to raise the rotation phase precision in conformity with an increase in the gain of the phase loop, and also to reduce, with respect to any disturbance to the capstan motor torque, the harmful influence on the rotational variations in conformity with an increase in the gain of the speed loop and further with a raise of the frequency characteristic. However, there exists a compromise in the gain balance between the phase loop and the speed loop, and if the gain of either loop is increased, resultant mutual interference thereof causes some problems including instability of the loops and a prolonged pull-in time for synchronization. Furthermore, since the linearity of the speed detector does not extent from a low frequency range to a high frequency range, another problem arises with regard to failure in achieving stable rotation speed control from slow rotation to fast rotation. In the method of controlling the capstan motor by additionally connecting the stop control circuit of the cited Japanese patent and switching the same selectively in relation to another stop control circuit separate from the closed servo loop, it is difficult to perform rapid and stable switching exactly from the closed servo loop to the stop control circuit, to eventually fail in attaining satisfactory characteristics.

OBJECT AND SUMMARY OF THE INVENTION

It is an object of the present invention to provide an improved capstan servo device which is capable of executing continuous control of a capstan motor smoothly from a stop to fast rotation through slow rotation to thereby change a playback operation smoothly from a still picture through slow motion reproduction to high speed reproduction.

According to one aspect of the present invention, there is provided a capstan servo device which comprises a frequency generator for detecting the rotation rate of a capstan motor and generating two-phase FG signals mutually having a 90° phase difference; a selector for selecting one of input four-phase signals which have a 90° phase difference mutually and are obtained by inverting and not inverting the two-phase FG signals and amplifying the same; and a sync signal generator having an N-bit counter (where $N \geq 2$) to receive a reference frequency signal inputted thereto and generating a sync signal by phase-comparing the two high-order bits of the frequency-divided output of the counter with the two-phase FG signals; wherein the rotation speed of the capstan motor is controlled in accordance with an error voltage signal selected by the selector in response to the sync signal.

According to another aspect of the present invention, there is provided a capstan servo device equipped additionally with a D-A (digital-to-analog) converter for converting the $(N-2)$ low-order bits of the frequency-divided output of the counter into an analog form, wherein the rotation speed of the capstan motor is controlled in accordance with a difference voltage between the output voltage of the D-A converter and the error voltage signal selected by the selector in response to the sync signal.

According to a further aspect of the present invention, there is provided a capstan servo device which includes, in addition to the constitution described above, a phase-locked loop (hereinafter referred to as PLL) for generating a reference frequency signal while being phase-locked to an internal reference signal during a recording mode or to a control signal during a playback mode, thereby controlling the rotation phase of the capstan motor.

Speed control is executed by the closed-loop phase servo in the above constitution, so that the capstan motor is continuously controllable with a smooth action from a stop through slow rotation to fast rotation.

Since the phase loop is connected in series to the speed loop, optimum values are settable in each of the loops with regard to the stability and the pull-in time for synchronization.

The above and other features and advantages of the present invention will become apparent from the following description which will be given with reference to the illustrative accompanying drawings.

BRIEF DESCRIPTION OF THE DRAWINGS

FIGS. 2A-2J are a waveform timing charts for explaining the operation of the first embodiment in FIG. 1;

FIGS. 10A-10J are waveform timing charts for explaining the stop control circuit in FIG. 9.

DESCRIPTION OF THE PREFERRED EMBODIMENTS

Figure 1:
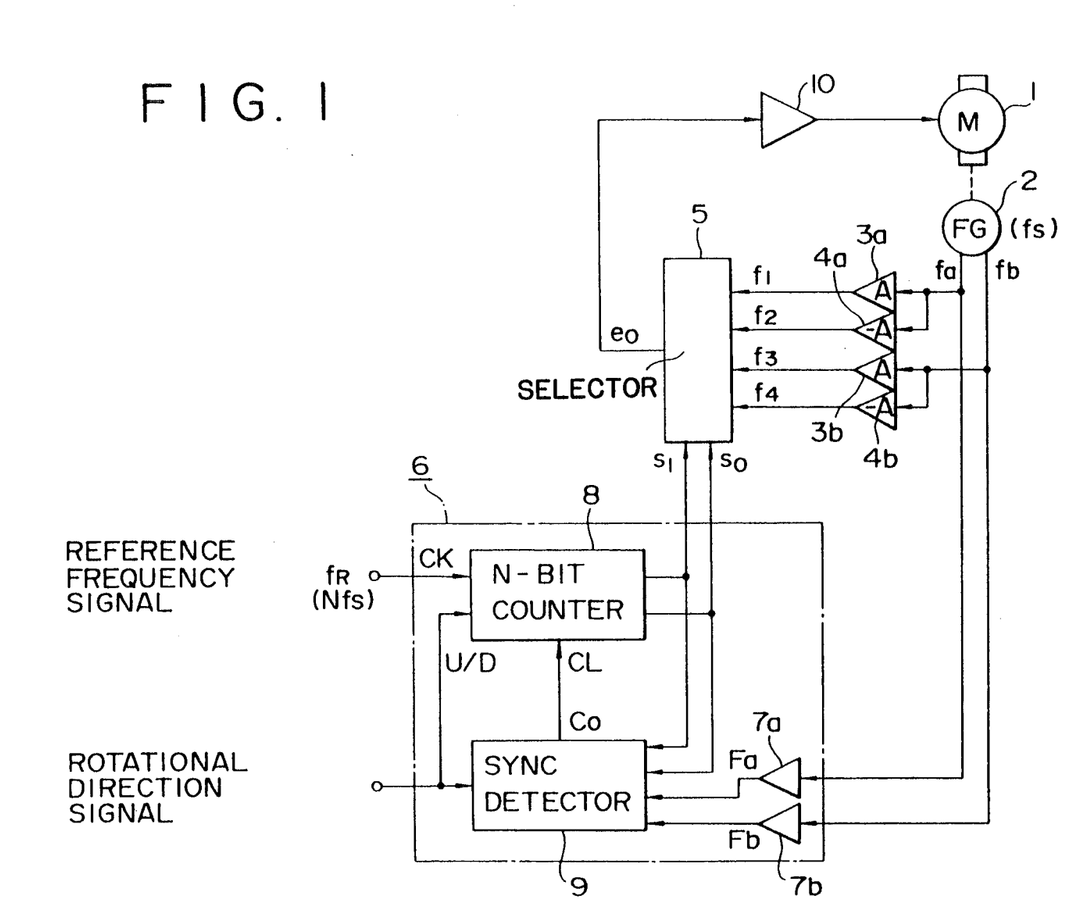
FIG. 1 is a block diagram of a first embodiment according to the present invention.

Hereinafter exemplary embodiments of the present invention will be described in detail with reference to the accompanying drawings. FIG. 1 is a block diagram of a first embodiment representing the capstan servo device of the present invention, wherein the same components as those used in FIG. 8 are denoted by the same reference numerals, and a repeated explanation thereof is omitted. Denoted by 5 is a selector for selecting one of four inputs in response to a 2-bit control signal and outputting the selected input. Reference numeral 6 denotes a sync signal generator comprising pulse shapers 7a, 7b, an N-bit counter 8 and a sync detector 9.

Figures 2A, 2B:
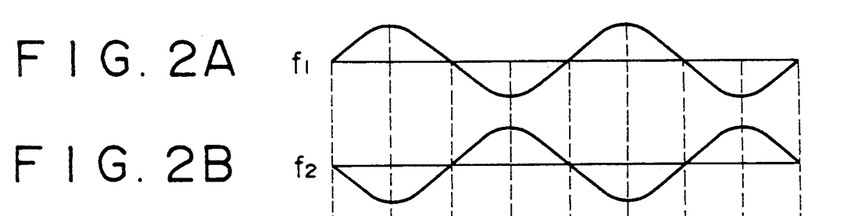
Figures 2C, 2D, 2E:
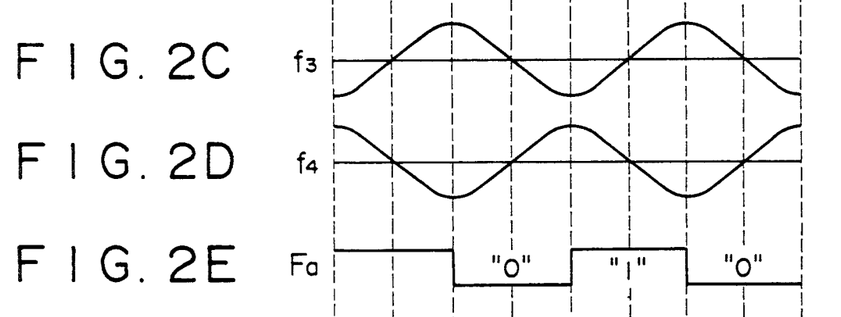
Figures 2F, 2G:
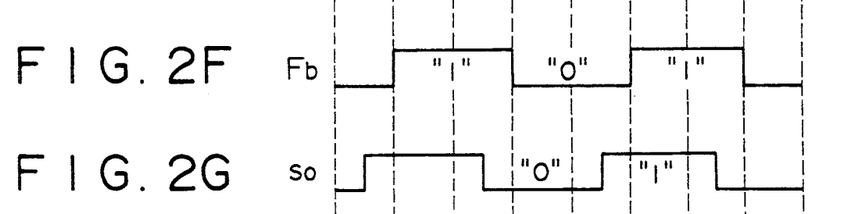
Figure 2H:
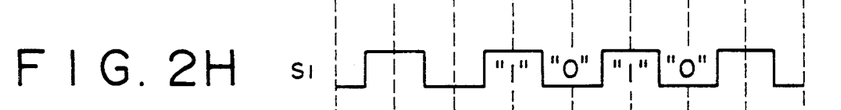
Figure 2J:
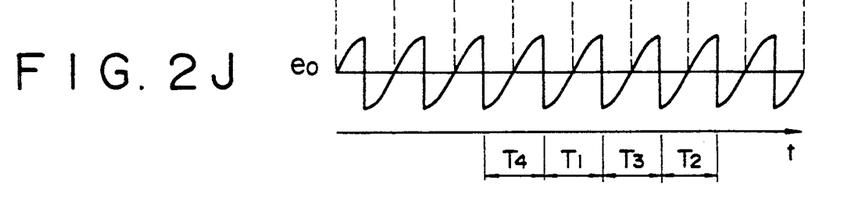

Now a detailed description will be given on the operation with reference to a waveform timing chart of FIG. 2. FG signals $f_a$, $f_b$ (of a frequency $f_s$) generated with rotation of a capstan motor 1 are fed respectively to non-inverting amplifiers 3a, 3b and inverting amplifiers 4a, 4b to become four-phase signals f1–f4 having a 90° phase difference mutually as shown in FIGS. 2A–2D, which are then supplied to input terminals of the selector 5. Simultaneously therewith, the FG signals $f_a$, $f_b$ are fed also to the sync signal generator 6 and are processed by the pulse shapers 7a, 7b to become digital signals $F_a$, $F_b$ as shown in FIGS. 2E and 2F. Meanwhile a reference frequency signal $f_R$ serving as a reference for the rotation rate of the capstan motor 1 is supplied to a clock input terminal CK of the N-bit counter 8 in the sync signal generator 6 so as to be frequency-divided or demultiplied by N. The waveforms of FIGS. 2G and 2H represent the two high-order bits $S_0$, $S_1$ in the N bits of the demultiplied output of the counter 8. Such output bits $S_0$, $S_1$ are supplied to the sync detector 9 to be compared with the digitized FG signals $F_a$, $F_b$, and the input CL of the counter 8 is controlled by an output $C_0$ obtained as a result of such comparison. In this stage, the FG signals are synchronized with the reference frequency signal, and the demultiplied outputs $S_0$, $S_1$ are fed as sync signals to the selector 5. Meanwhile a rotational frequency signal indicating the forward or backward rotation of the capstan motor 1 is supplied to the U/D input terminal of the counter 8 and also to the sync detector 9.

The waveform timing charts of FIGS. 2A-2J illustrate the phase relation among the signals in the synchronized state of the capstan servo device. In the selector 5: a signal $f_1$ is selected during a time period T1 where the bits of the sync signals $S_0$, $S_1$ are combined as (0, 0); a signal $f_4$ is selected during a time period T4 where the bits are (0, 1); a signal $f_2$ is selected during a time period T2 where the bits are (1, 0); and a signal $f_3$ is selected during a time period T3 where the bits are (1, 1). Thus, there is extracted a signal $D_0$ of the waveform shown in FIG. 2J which is composed merely of the left slope portions having a ¼ period of the original FG signal. And the error voltage signal $e_0$ of such waveform is supplied to the driver 10 to thereby form a closed loop for controlling the capstan motor 1 at a predetermined rotation rate.

Hereinafter the process of synchronization will be described in further detail. Suppose now an exemplary case where the rotation of the capstan motor 1 has reached its steady state after a power supply for the capstan servo device is switched on. In sych unsynchronized condition, the signals $F_a$, $F_b$ of FIGS. 2E, 2F are not stable in the timing relation to the signals $S_0$, $S_1$ of FIGS. 2G, 2E and have fluctuations thereto. The states of the signals $S_0$, $S_1$ corresponding to the relationship between the four time periods in FIG. 2 and the signals $F_a$, $F_b$ are as follows.

During the time period T1 where a synchronism is attained if the signal $F_b$ is "0", there occurs a lag or a lead when $(F_a, F_b)$ are (0, 1) or (1, 1) respectively. Also during the time period T2 where a synchronism is attained if the signal $F_b$ is "1", there occurs a lag or a lead when $(F_a, F_b)$ are (0, 1) or (1, 1) respectively. During the time period T3 where a synchronism is attained if the signal $F_a$ is "1", there occurs a lag or a lead when $(F_a, F_b)$ are (0, 1) or (1, 1) respectively. Further during the time period T4 where a synchronism is attained if the signal $F_a$ is "0", there occurs a lag or a lead when $(F_a, F_b)$ are (0, 1) or (1, 1) respectively. Thus a lag, a synchronism and a lead of $(F_a, F_b)$ are existent in conformity with the four states of the signals $(S_0, S_l)$ Therefore the synchronization can be performed by first detecting such lag or lead by the sync detector 9 and then presetting, in accordance with the detected lag or lead, the clock input of the counter 8 forcibly to the values of $(S_0, S_1)$ suited for synchronizing with the states of $(F_a, F_b)$. More specifically, there occurs a lag during the time period T1 when $(F_a, F_b)$ are (0, 1) in case $(S_0, S_1)$ are (0, 0). Since a synchronism of $(S_0, S_1)$ conforming to such state is attained with values (0, 1) corresponding to the time period T4, the desired synchronism is achieved by outputting a control signal $C_0$ to preset the clock input forcibly to such values.

Figure 3:
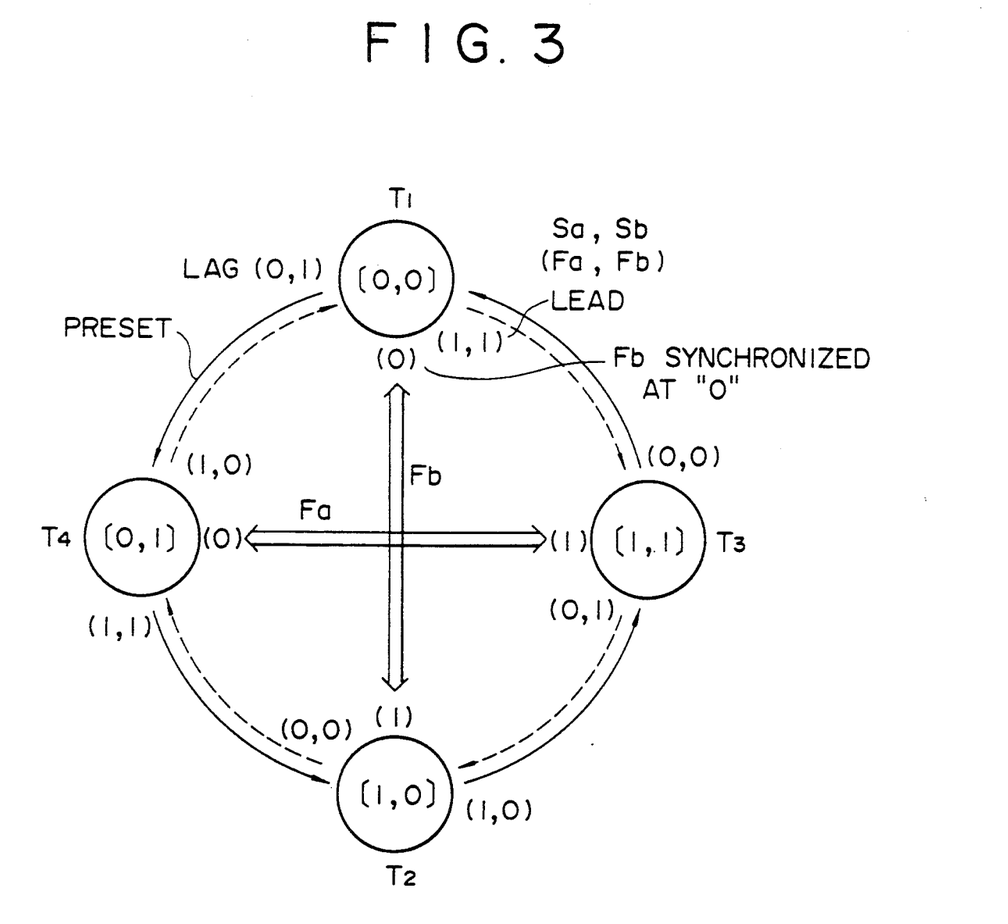
FIG. 3 is a state transition diagram for explaining the synchronization by a sync signal generator employed in FIG. 1.

The combinations of preset values $C_0$ and the values of such lag, synchronism and lead of $(F_a, F_b)$ with respect to the four states of $(S_0, S_1)$ for synchronization are shown in FIG. 3 which illustrates transitions of the synchronized state of the sync signal generator 6. In this diagram, the values of $F_a$, $F_b$ for synchronizing the state values of $(S_0, S_1)$ during the time periods enclosed with four ellipses are shown at the heads of double lines, and lag values are shown at the bases of counterclockwise solid lines, while lead values are shown at the bases of clockwise broken lines respectively with regard to the values of $(F_a, F_b)$ This diagram signaifies that synchronization can be achieved by outputting a preset control signal $C_0$ to the state values of $(S_0, S_1)$ within the ellipse at the head of the arrow. In the sync detector 9, a control signal $C_0$ for presetting the counter 8 is outputted in accordance with the state transition diagram, and sync signals $S_0$, $S_1$ are generated through synchronization with the input FG signals $F_a \times F_b$ to thereby control the selector 5. The operation mentioned above is repeated cyclically to synchronize the servo loop, thereby placing the same in the locked state of FIG. 2.

Figure 4:
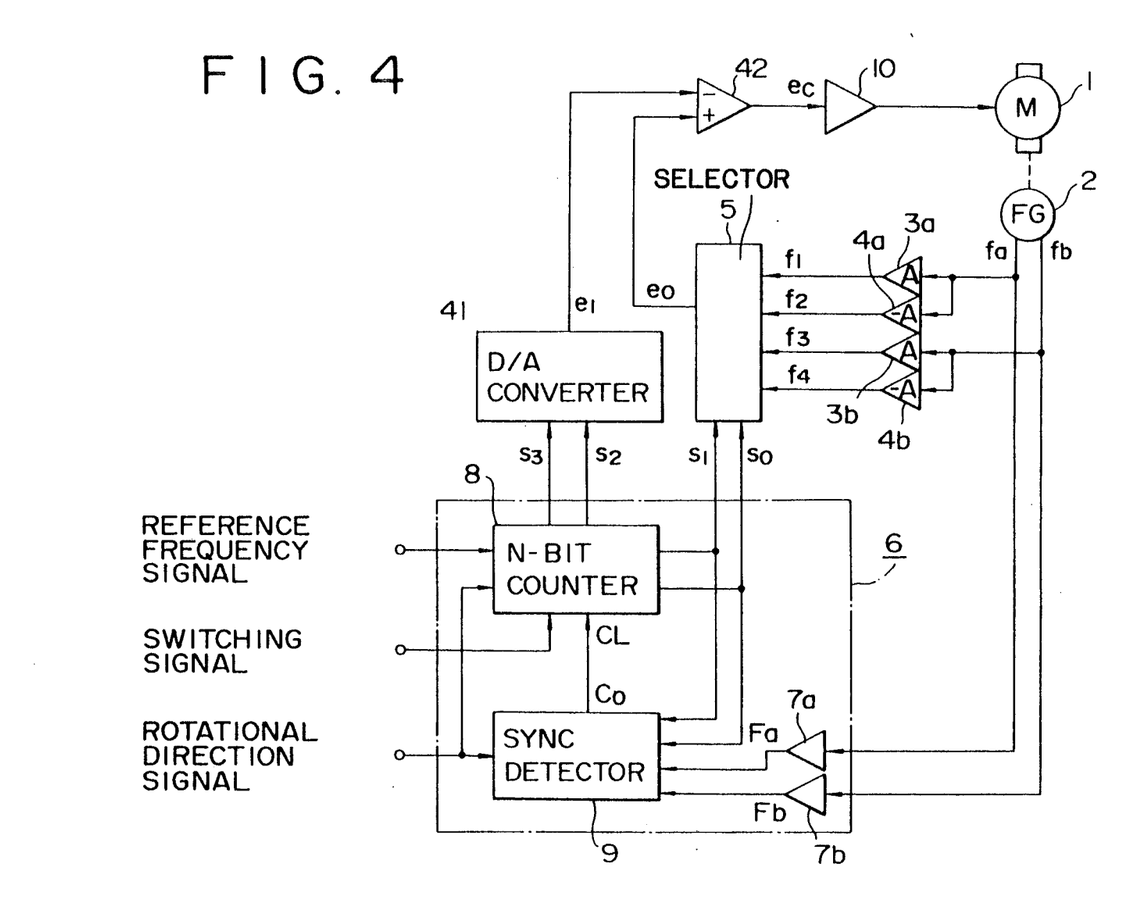
FIG. 4 is a block diagram of a second embodiment according to the present invention.

FIG. 4 is a block diagram of a second embodiment representing the capstan servo device of the present invention. This embodiment includes, in addition to the aforementioned constitution of FIG. 1, a D-A converter 41 for extracting the low-order bits from a counter in a sync signal generator 6 and executing digital-to-analog conversion of the extracted signal, and a differential amplifier 42 for producing the difference between the output $e_1$ of the D-A converter 41 and the output $e_0$ of a selector 5.

Figure 5A:
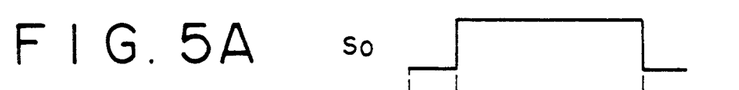
FIGS. 5A-5G are a waveform timing charts for explaining the operation of the second embodiment in FIG. 4.
Figure 5B:
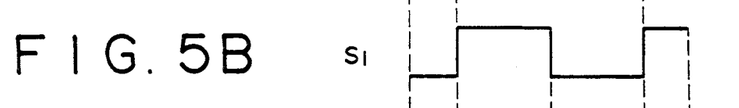
Figure 5C:
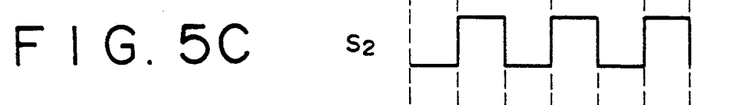
Figure 5D:
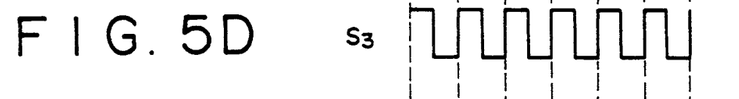
Figure 5E:
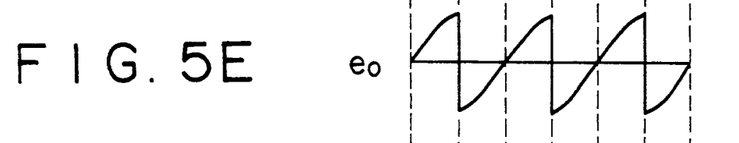
Figure 5F:
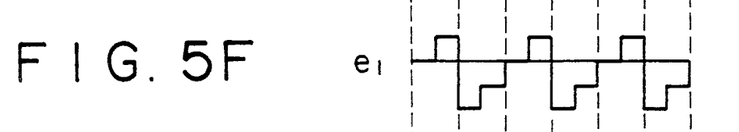
Figure 5G:
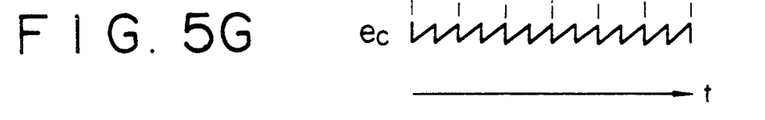

Now the operation of the second embodiment will be described below with reference to waveform timing charts of FIGS. 5A-5G. FIGS. 5A and 5B denote sync signals $S_0$, $S_1$ corresponding to FIGS. 2G and 2B respectively, and FIG. 5E denotes an error voltage signal $e_0$ corresponding to FIG. 2J. Assuming now that N=4 in the counter 8, low-order bits $S_2$, $S_3$ of FIGS. 5C and 5D can be extracted as demultiplied outputs. Such outputs $S_2$, $S_3$ are fed to the D-A converter 41, which then produces an analog output $e_1$ of FIG. 5F. This output $e_1$ is supplied to the differential amplifier 42, where the difference between such output $e_1$ and the output $e_0$ of the selector 5 is produced as a differential output $e_C$. In the new error voltage signal $e_C$ thus obtained, the lower frequency component has been removed from the output $e_0$ of the selector 5, and the voltage ripple has been reduced to $\frac{1}{2}^{N-2}$. Therefore, when slow rotation control is executed for the capstan motor 1 in the first embodiment by lowering the frequency of the reference frequency signal $f_R$, the problem of electromagnetic noise generated by the ripper current from the capstan motor 1 can be improved if the error voltage output $e_0$ of the selector 5 is reduced into a range of 100 Hz to several kHz.

Figure 6:
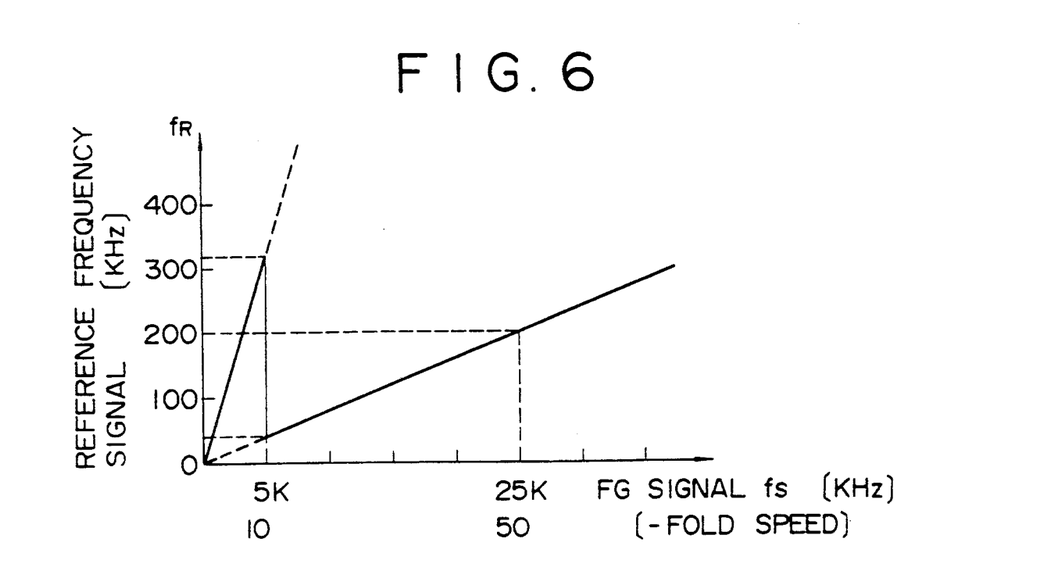
FIG. 6 graphically shows the characteristics between an FG signal and a reference frequency signal in a changed-speed control action.

The following is an exemplary case of rotating the capstan motor 1 at a high speed by raising the reference frequency signal $f_R$. The reference frequency signal $f_R$ is expressed as $f_R = f_S \cdot 2^N$, where $f_S$ is the FG signal frequency, and N is the number of stages of the counter 8. And for controlling the capstan motor 1 from a stop to fast rotation, the frequency range of the signal $f_R$ is so widened as to cover from 0 to $f_S \cdot 2^N$ Hz. If the frequency $f_S$ of the FG signal generated at the standard rotation of the capstan motor 1 is set to 500 Hz, the reference frequency signal $f_R$ comes to have a frequency of 32 kHz with N of the counter 8 being 6 bits. The frequency becomes 320 kHz at a 10-fold speed, and 1.6 MHz at a 50-fold speed. FIG. 6 graphically shows the relationship between the FG frequency $f_S$ and the reference frequency signal $f_R$ under control at changed speeds. The number N of stages of the counter 8 is selectively switched in such a manner as to become 3 bits at any frequency higher than the border FG frequency $f_S = 5$ kHz during the operation at a 10-fold speed, whereby the reference frequency signal $f_R$ can be changed to 40 kHz at a 10-fold speed or to 200 kHz at a 50-fold speed. It is thus possible to realize linear control of the capstan motor from a stop to fast rotation without widening the frequency range of the reference frequency signal $f_R$.

Figure 7:
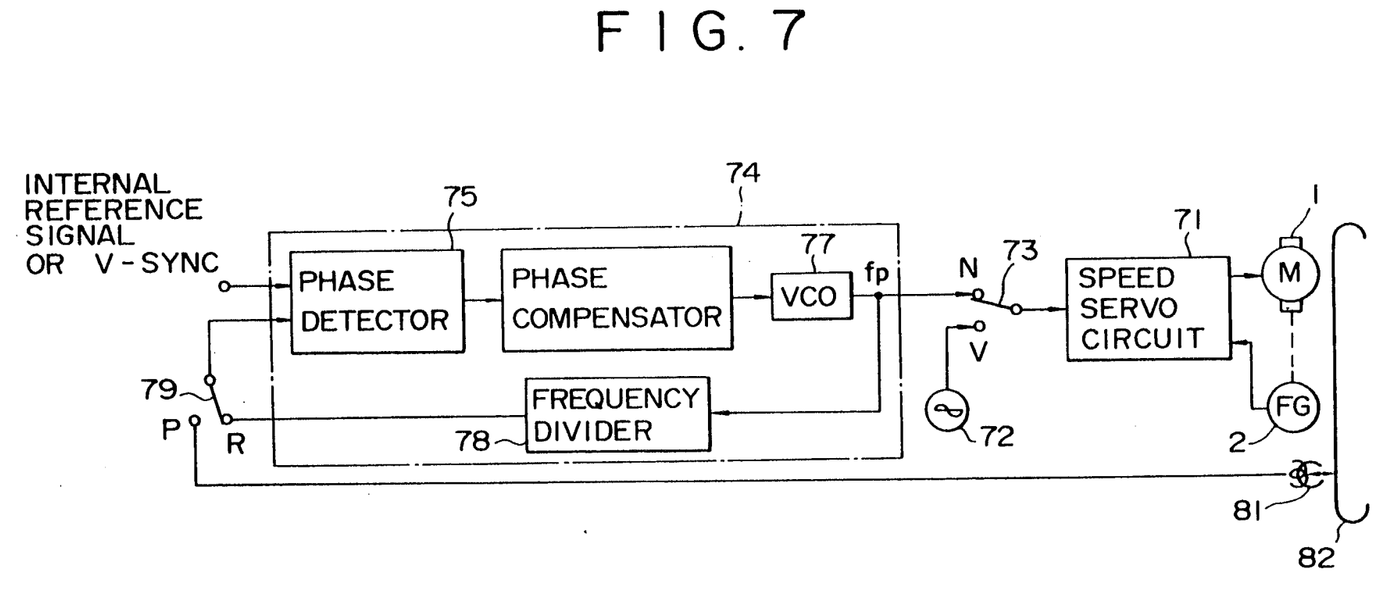
FIG. 7 is a block diagram of a third embodiment according to the present invention.

FIG. 7 is a block diagram of a third embodiment representing the capstan servo device of the present invention. In this diagram, reference numeral 71 denotes a speed servo circuit contrived by modifying the capstan servo device described already in connection with the first embodiment, wherein partial internal circuits in FIG. 1 are eliminated inclusive of the FG signal input from the FG 2 and the circuit from the reference frequency signal input to the driving output for the capstan motor 1. Further shown components include a reference frequency generator 72, a switch circuit (A) 73, a switch circuit (B) 79, and a PLL circuit 74 comprising a phase detector 75, a phase compensator 76, a VCO (voltage controlled oscillator) 77, and a frequency divider 78.

In the third embodiment, the phase loop described with regard to the conventional capstan servo device of FIG. 8 is additionally incorporated in the first embodiment of the present invention shown in FIG. 1, and the speed loop and the phase loop are connected in series to each other.

Now the operation of the embodiment shown in FIG. 7 will be described below.

First in a standard recording/playback mode, the switch circuit (A) 73 is selectively connected to its N side. And in a recording operation where the switch circuit (B) 79 is connected to its R side, a continuous frequency signal $f_P$ phase-locked to either an internal reference signal or a V-SYNC signal is generated from the PLL circuit 74 and then is supplied as a reference frequency signal to the speed servo circuit 71. Meanwhile in a playback operation, the switch circuit (B) 79 is changed to its P side to be connected to the control head 81. As a result, a phase servo is achieved for rotating the capstan motor in such a manner that, during the recording operation, the rotation phase of the capstan motor is synchronized with the internal reference signal similarly to the phase loop employed in the conventional capstan servo device of FIG. 8; and during the playback operation, the CTL signal read out by the control head 81 from a control track (not shown) on the magnetic tape 82 is synchronized with the phase of the V-SYNC signal. Subsequently in response to a change of the switch circuit (A) 73 to its V side, the aforementioned phase loop is disconnected from the above state and then is connected to the reference frequency generator 72, so that the speed loop alone functions to execute speed control in accordance with the reference frequency. Since this control is the same as the one described in detail with regard to the first and second embodiments, a repeated explanation is omitted here.

It is to be understood that the present invention is not limited merely to the above embodiments representing exemplary cases of speed control for the capstan motor, and it may also be applied to speed control for a linear motor (VCM) or the like.

In the present invention, as described above in detail, the speed loop for the capstan motor is controlled by the phase servo alone based on the FG signal, so that any loop characteristic variation derived from the rotation speed of the capstan motor can be eliminated to consequently achieve wide range control covering from a stop to fast rotation.

Furthermore, since the speed loop and the phase loop are connected in series to each other, any torque disturbance from the capstan motor can be absorbed by the speed loop to attain a great improvement in elimination of rotational variations. In addition, the phase loop serves to control merely the phase relation between the V-SYNC signal and the CTL signal without functioning directly as a loop for control of the capstan motor, so that the loop gain need not be raised beyond the necessity to eventually realize adequate setting for attaining required stability.

Due to the provision of such capstan servo device in a VTR, it is rendered possible to enhance the stop position accuracy of a magnetic tape to a rotary magnetic head as well as to realize a continuously changeable motion of the magnetic tape, hence accomplishing remarkable effects relative to a superior still picture quality and a special playback function adapted for smooth and continuous speed changes covering from slow playback to fast playback.

What is claimed is:

1. A capstan servo device comprising:
   a frequency generator for detecting the rotation rate of a capstan motor and generating two-phase FG signals mutually having a 90° phase difference;
   a selector for selecting one of input four-phase signals mutually having a 90° phase difference, said four-phase signals being obtained by inverting and not inverting said two-phase FG signals and amplifying the same; and
   a sync signal generator including an N-bit counter (where $N \geq 2$) to receive a reference frequency signal inputted thereto and generating a sync signal by phase-comparing the two high-order bits of the frequency-divided output of said counter with said two-phase FG signals;
   wherein the rotation speed of said capstan motor is controlled in accordance with an error voltage signal selected by said selector in response to the sync signal.

2. The capstan servo device according to claim 1, wherein said reference frequency signal is changed from a zero frequency through a low frequency range to a high frequency range so as to control the rotation rate of said capstan motor from a halt to a high speed.

3. A capstan servo device comprising:
   a frequency generator for detecting the rotation rate of a capstan motor and generating two-phase FG signals mutually having a 90° phase difference;
   a selector for selecting one of input four-phase signals mutually having a 90° phase difference, said four-phase signals being obtained by inverting and not inverting said two-phase FG signals and amplifying the same;
   a sync signal generator including an N-bit counter (where $N \geq 2$) to receive a reference frequency signal inputted thereto and generating a sync signal by phase-comparing the two high-order bits of the frequency-divided output of said counter with said two-phase FG signals; and
   a D-A (digital-to-analog) converter for converting the (N−2) low-order bits of the frequency-divided output of said counter into an analog form;
   wherein the rotation speed of said capstan motor is controlled in accordance with a difference voltage between the output voltage of said D-A converter and the error voltage signal selected by said selector in response to the sync signal.

4. The capstan servo device according to claim 3, wherein the frequency division ratio of said counter in said sync signal generator is switchable to be lower at the fast rotation of said capstan motor.

5. A capstan servo device comprising:

a frequency generator for detecting the rotation rate of a capstan motor and generating two-phase FG signals mutually having a 90° phase difference;

a selector for selecting one of input four-phase signals mutually having a 90° phase difference, said four-phase signals being obtained by inverting and not inverting said two-phase FG signals and amplifying the same;

a phase locked loop for generating a reference frequency signal while being phase-locked to an internal reference signal during a recording mode or to a control signal during a playback mode; and a sync signal generator including an N-bit counter (where $N \geq 2$) to receive said reference frequency signal inputted thereto and generating a sync signal by phase-comparing the two high-order bits of the frequency-divided output of said counter with said two-phase FG signals;

wherein the rotation speed and the rotation phase of said capstan motor are controlled in accordance with an error voltage signal selected by said selector in response to the sync signal.

* * * * *